United States Patent
Tsujiguchi et al.

(10) Patent No.: US 8,289,559 B2
(45) Date of Patent: Oct. 16, 2012

(54) PRINTING APPARATUS AND PROCESSING METHOD THEREFOR

(75) Inventors: Hiroko Tsujiguchi, Kawasaki (JP);
Hideki Nakanishi, Kawasaki (JP);
Hiroshi Uemura, Zushi (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 12/708,337

(22) Filed: Feb. 18, 2010

(65) Prior Publication Data

US 2010/0214613 A1    Aug. 26, 2010

(30) Foreign Application Priority Data

Feb. 25, 2009  (JP) .................................. 2009-043147

(51) Int. Cl.
*G06F 15/00* (2006.01)

(52) U.S. Cl. .................... 358/1.16; 358/3.26; 358/3.16; 358/3.19; 347/15

(58) Field of Classification Search .................. None
See application file for complete search history.

(56) References Cited

U.S. PATENT DOCUMENTS 6,315,391 B1    11/2001   Kanematsu
2004/0042047 A1*  3/2004  Kawatoko et al. ........... 358/3.06

FOREIGN PATENT DOCUMENTS

JP    2000141617 A    5/2000
JP    2004209765 A    7/2004

* cited by examiner

*Primary Examiner* — Twyler Haskins
*Assistant Examiner* — Helen Q Zong
(74) *Attorney, Agent, or Firm* — Fitzpatrick, Cella, Harper & Scinto (57) ABSTRACT

A printing apparatus which prints by scanning a printhead in two directions based on raster data containing multi-valued data, sequentially stores multi-valued data contained in each raster data in a print buffer in correspondence with a predetermined direction of the two directions, acquires for each raster data, identification information corresponding to the multi-valued data stored in the print buffer first and identification information corresponding to the multi-valued data stored in the print buffer lastly for each tone value based on initial values of identification information and the number of multi-valued data contained in each raster data, generates bitmap data from the multi-valued data using pattern data read out based on identification information selected based on a scanning direction of the printhead, and controls printing of the printhead based on the generated bitmap data.

6 Claims, 9 Drawing Sheets

|  | PATTERN 1 | PATTERN 2 | PATTERN 3 | PATTERN 4 |
|---|---|---|---|---|
| LEVEL 00 | ⬜⬜/⬜⬜ | | | |
| LEVEL 01 | ⬛⬜/⬜⬜ | ⬜⬛/⬜⬜ | ⬜⬜/⬜⬛ | ⬜⬜/⬛⬜ |
| LEVEL 02 | ⬛⬛/⬜⬜ | ⬜⬛/⬜⬛ | ⬜⬜/⬛⬛ | ⬛⬜/⬛⬜ |
| LEVEL 03 | ⬛⬜/⬜⬛ | ⬜⬛/⬛⬜ | ⬛⬜/⬜⬛ | ⬜⬛/⬛⬜ |

|  | ADDRESS 1 | ADDRESS 2 | ADDRESS 3 |
|---|---|---|---|
| 105A | 1 | 4 | 2 |
| 106A | 1 | 2 | 1 |

FIG. 10B

|  | ADDRESS 1 | ADDRESS 2 | ADDRESS 3 |
|---|---|---|---|
| 105B | 2 | 1 | 1 |
| 106B | 1 | 3 | 2 |

PRINTING APPARATUS AND PROCESSING METHOD THEREFOR

BACKGROUND OF THE INVENTION

1. Field of the Invention

The present invention relates to a printing apparatus and a processing method therefor.

2. Description of the Related Art

A printing apparatus which prints on a printing medium is known. When the printing apparatus receives data from, e.g., a host, it rasterizes the received data into binary bitmap data. The printing apparatus then transfers the bitmap data to a printhead to print it. Binary bitmap data or multi-valued data is sent from the host to the printing apparatus. If the sent data is multi-valued data, the printing apparatus rasterizes it. The rasterization timing is, for example, the time of H/V conversion of data when it is stored in a buffer or the time of sending data to the printhead (printhead control unit) when multi-valued data is stored in the buffer intact.

If a fixed rasterization table (dot matrix) alone is set for the tone of each pixel in preparation for the above-mentioned rasterization, a single rasterization pattern is obtained for the same tone. Such rasterization into a fixed pattern may generate stripes and nonuniformity attributed to nozzle contamination or a variation in nozzle discharge amount.

To combat this situation, one known method sets a plurality of dot matrices for the tone of each pixel, selects one of these plurality of dot matrices, and rasterizes the selected dot matrix. In this case, a pattern corresponding to each tone is not fixed and therefore the printing result is less subject to, e.g., nozzle contamination.

Some methods of selecting one of a plurality of dot matrices have been proposed. Examples of these methods are a method of selection based on the column position, a method of random selection by generating random numbers, and a method of changing the dot matrix for use in rasterization of a given tone every time data with the given tone appears (Japanese Patent Laid-Open Nos. 2000-141617 and 2004-209765).

In the method of selection by changing the dot matrix for use in rasterization of a given tone every time data with the given tone appears, it is often the case that the results of printing the same data in only the forward direction and in both the forward and backward directions are inconsistent with each other.

This inconsistency between these printing results will be explained herein. To rasterize a raster in the forward direction in forward printing, the initial value of the pattern number is set for the raster leading edge, dot matrices are sequentially selected based on the set initial value, and respective data within the raster are rasterized using the selected matrices. In contrast, to rasterize a raster in the backward direction in backward printing, the initial value of the pattern number is set for the raster trailing edge, dot matrices are sequentially selected based on the set initial value, and respective data within the raster are rasterized using the selected matrices. As a result, even data with the same tone at the same position is rasterized in a pattern which differs between when rasterization starts from the raster leading edge and when rasterization starts from the raster trailing edge. In other words, when the matrix is changed every time data appears in rasterization in the forward raster direction (forward direction), the pattern at the raster trailing edge, which has an initial value in rasterization in the backward raster direction (backward direction), differs depending on the number of tones within the raster.

SUMMARY OF THE INVENTION

The present invention provides a technique for making the results of one-way printing and two-way printing consistent with each other in an arrangement which changes the dot matrix for use in rasterization of a given tone every time data with the given tone appears.

According to a first aspect of the present invention there is provided a printing apparatus which prints by scanning a printhead in two directions based on raster data containing multi-valued data, the apparatus comprising: a print buffer configured to store a plurality of raster data; a buffer control unit configured to sequentially store multi-valued data contained in each raster data in the print buffer in correspondence with a predetermined direction of the two directions; a pattern buffer configured to store pattern data corresponding to a tone value of the multi-valued data; an acquisition unit configured to acquire, for each raster data, identification information corresponding to the multi-valued data stored in the print buffer first and identification information corresponding to the multi-valued data stored in the print buffer lastly for each tone value based on initial values of identification information and the number of multi-valued data contained in each raster data; a generation unit configured to generate bitmap data from the multi-valued data using pattern data read out from the pattern buffer based on one identification information selected from the two pieces of identification information based on a scanning direction of the printhead for each scanning of the printhead; and a print control unit configured to control printing of the printhead based on the bitmap data generated by the generation unit.

According to a second aspect of the present invention there is provided a processing method for a printing apparatus which includes a pattern buffer configured to store pattern data corresponding to a tone value of multi-valued data, and prints by scanning a printhead in two directions based on raster data containing the multi-valued data, the method comprising: sequentially storing multi-valued data contained in each raster data in the print buffer in correspondence with a predetermined direction of the two directions; acquiring, for each raster data, identification information corresponding to the multi-valued data stored in the print buffer first and identification information corresponding to the multi-valued data stored in the print buffer lastly for each tone value based on initial values of identification information and the number of multi-valued data contained in each raster data; generating bitmap data from the multi-valued data using pattern data read out from the pattern buffer based on one identification information selected from the two pieces of identification information based on a scanning direction of the printhead for each scanning of the printhead; and controlling printing of the printhead based on the bitmap data generated in the generating the bitmap data.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Preferred embodiments of the present invention will be described in detail below with reference to the accompanying drawings. In the following description, a printing apparatus using an inkjet printing method will be exemplified. The printing apparatus using the inkjet printing method may be, for example, a single-function printer having only a print function, or a multi-function printer having a plurality of functions including a print function, FAX function, and scanner function. Also, the printing apparatus using the inkjet printing method may be a manufacturing apparatus for manufacturing a color filter, electronic device, optical device, microstructure, or the like by the inkjet printing method.

In this specification, "printing" means not only forming significant information such as characters or graphics but also forming, for example, an image, design, pattern, or structure on a printing medium in a broad sense regardless of whether the formed information is significant, or processing the medium as well. In addition, the formed information need not always be visualized so as to be visually recognized by humans.

Also, a "printing medium" means not only a paper sheet for use in a general printing apparatus but also a member which can fix ink, such as cloth, plastic film, metallic plate, glass, ceramics, resin, lumber, or leather in a broad sense.

Also, "ink" should be interpreted in a broad sense as in the definition of "printing" mentioned above, and means a liquid which can be used to form, for example, an image, design, or pattern, process a printing medium, or perform ink processing upon being supplied onto the printing medium. The ink processing includes, for example, solidification or insolubilization of a coloring material in ink supplied onto a printing medium.

Figure 1:
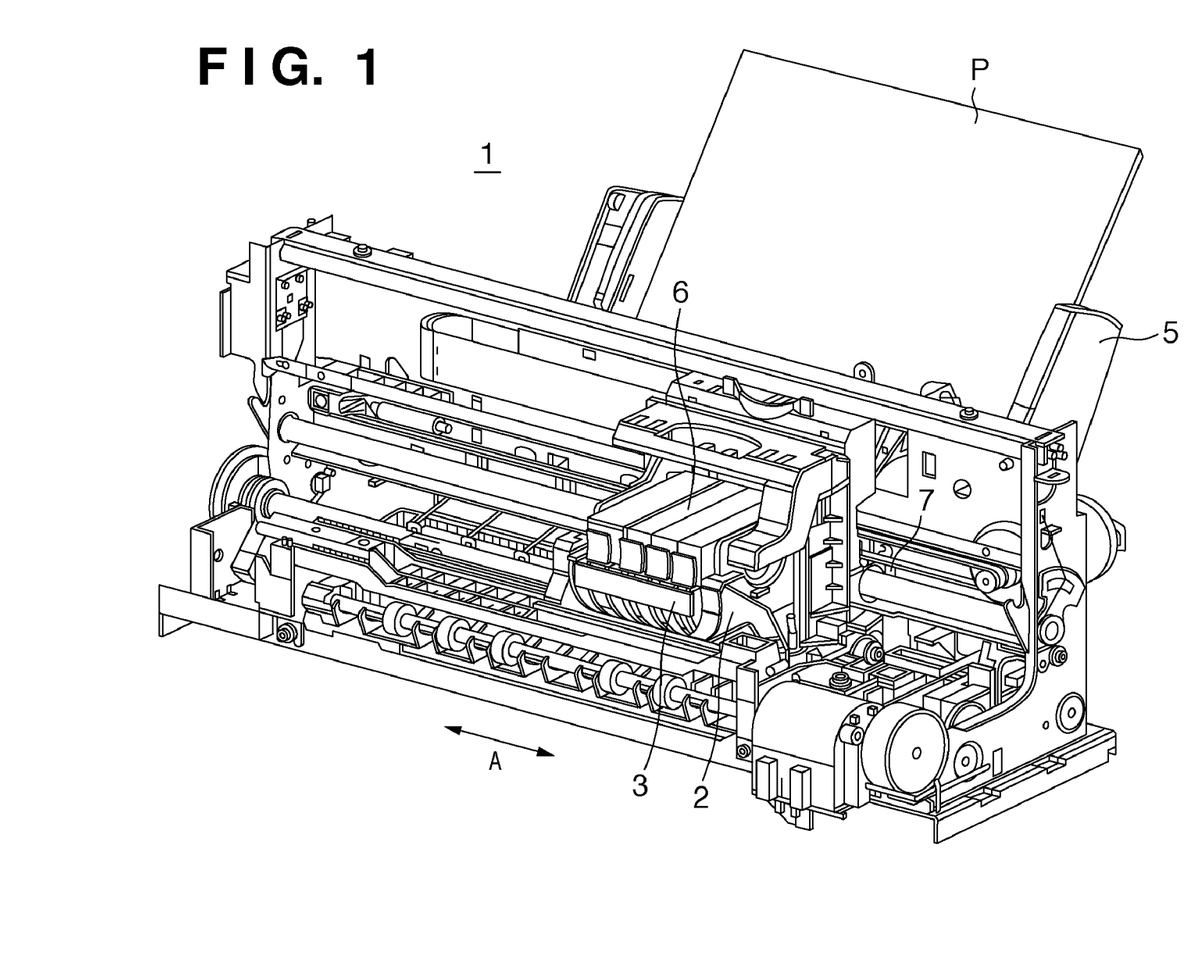
FIG. 1 is a perspective view showing an example of the outer arrangement of an inkjet printing apparatus 1 according to one embodiment of the present invention.

FIG. 1 is a perspective view showing an example of the outer arrangement of an inkjet printing apparatus 1 according to one embodiment of the present invention.

The inkjet printing apparatus (to be simply referred to as a printing apparatus hereinafter) 1 includes an inkjet printhead (to be simply referred to as a printhead hereinafter) 3 which is mounted on a carriage 2 and prints by discharging ink in accordance with the inkjet scheme. The printing apparatus 1 prints by reciprocally moving the carriage 2 in the direction indicated by the two-headed arrow A. The printing apparatus 1 supplies a printing medium P such as a printing sheet via a sheet supply mechanism 5 and conveys it to the printing position. The printing apparatus 1 prints at the printing position by discharging ink from the printhead 3 to the printing medium P.

The carriage 2 of the printing apparatus 1 mounts, for example, an ink cartridge 6, in addition to the printhead 3. The ink cartridge 6 stores ink to be supplied to the printhead 3. Note that the ink cartridge 6 is detachable from the carriage 2. The printing apparatus 1 shown in FIG. 1 can print in color. For this reason, the carriage 2 mounts four ink cartridges which respectively store magenta (M), cyan (C), yellow (Y), and black (K) inks. These four ink cartridges can be independently attached/detached.

The printhead 3 according to this embodiment adopts the inkjet scheme in which ink is discharged using thermal energy. For this reason, the printhead 3 includes electrothermal transducers. The electrothermal transducers are disposed in correspondence with respective discharge orifices, and a pulse voltage is applied to a corresponding electrothermal transducer in accordance with a printing signal. With this operation, ink is discharged from a corresponding discharge orifice.

Figure 2:
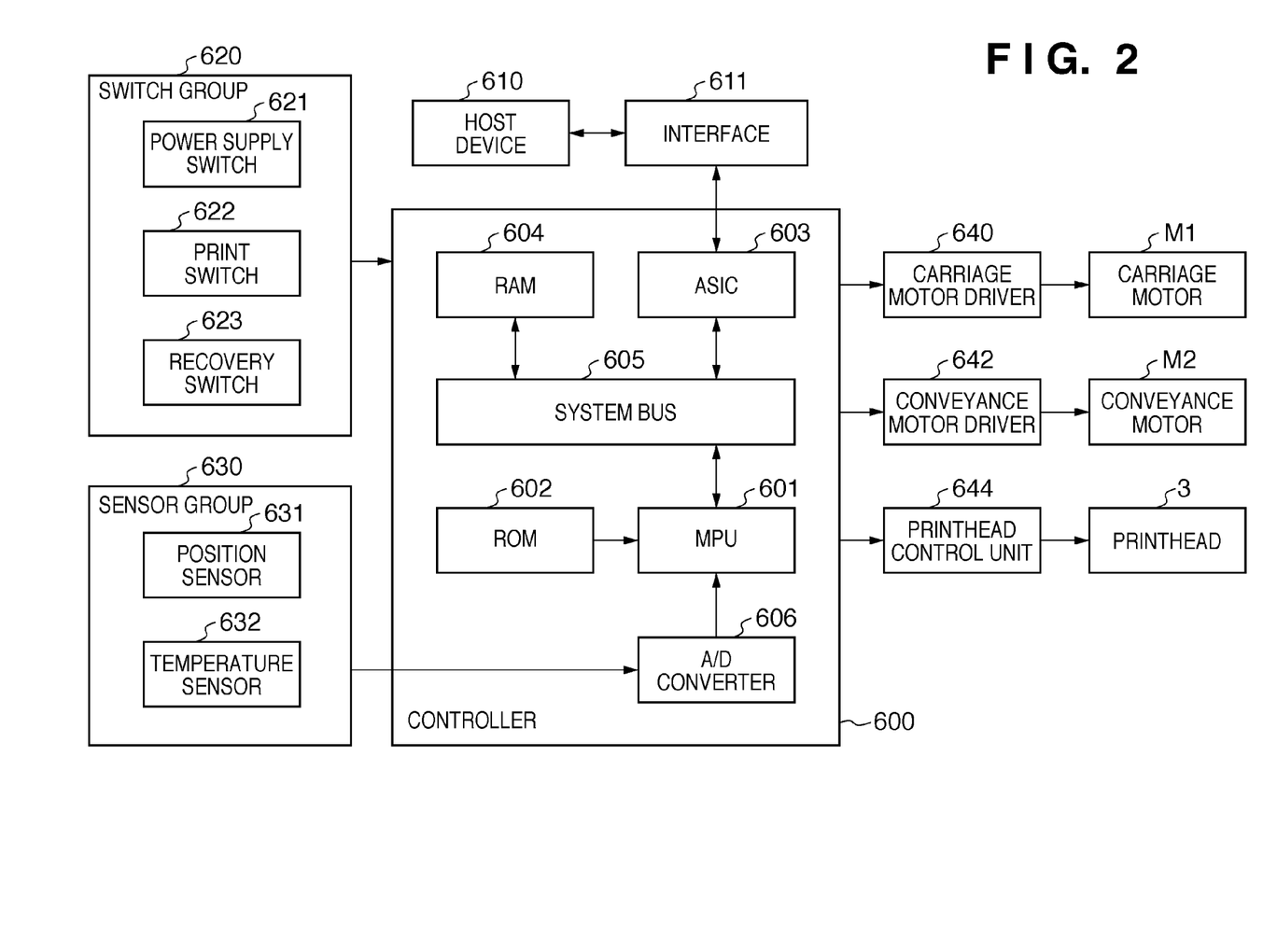
FIG. 2 is a block diagram showing an example of the functional configuration of the printing apparatus 1 shown in FIG. 1.

FIG. 2 is a block diagram showing an example of the functional configuration of the printing apparatus 1 shown in FIG. 1.

The printing apparatus 1 holds a plurality of rasterization tables (pattern data or dot matrices) in correspondence with the respective tones of multi-valued data, and rasterizes the multi-valued data into bitmap data using one of these rasterization tables. The printing apparatus 1 then prints a halftone image based on the obtained bitmap data. The printing apparatus 1 according to this embodiment changes the rasterization table for use in rasterization of a given tone every time data with the given tone appears. Hence, even data with the same tone are rasterized in different patterns.

A controller 600 includes, e.g., an MPU 601, ROM 602, ASIC (Application Specific Integrated Circuit) 603, RAM 604, system bus 605, and A/D converter 606. The ROM 602 stores a program corresponding to a control sequence (to be described later), necessary tables, and other fixed data. The ASIC 603 controls a carriage motor M1 and conveyance motor M2. Also, the ASIC 603 generates a signal to control the printhead 3. The RAM 604 is used as, e.g., an image data rasterization area and a working area for program execution. The system bus 605 connects the MPU 601, ASIC 603, and RAM 604 to each other to transfer data among them. The A/D converter 606 A/D-converts an analog signal input from a sensor group (to be described later) and supplies the converted digital signal to the MPU 601.

A switch group 620 includes, e.g., a power supply switch 621, print switch 622, and recovery switch 623. A sensor group 630 for detecting the apparatus state includes, e.g., a position sensor 631 and temperature sensor 632.

In print scanning by the printhead 3, the ASIC 603 transfers data to drive a printing element (discharge heater) to the printhead 3 while directly accessing the storage area of the RAM 604.

The carriage motor M1 is a driving source for reciprocally scanning the carriage 2 in the direction indicated by the two-headed arrow A, and a carriage motor driver 640 controls the driving of the carriage motor M1. The conveyance motor M2 is a driving source for conveying the printing medium P, and a conveyance motor driver 642 controls the driving of the conveyance motor M2. A printhead control unit 644 controls the printhead 3 based on printing data input from the controller 600. The printhead 3 is scanned in a direction (to be referred to as the scanning direction hereinafter) perpendicular to the direction in which the printing medium P is conveyed. The printhead 3 prints in one of a one-way print mode and a two-way print mode.

A computer (or, e.g., an image reader or a digital camera) 610 serving as an image data supply source is generically called, for example, a host device. Image data, commands, and status signals, for example, are transferred between the host device 610 and the printing apparatus 1 via an interface (to be abbreviated as an I/F hereinafter) 611. This image data is input as data in the form of a raster (to be referred to as raster data hereinafter).

Figure 3:
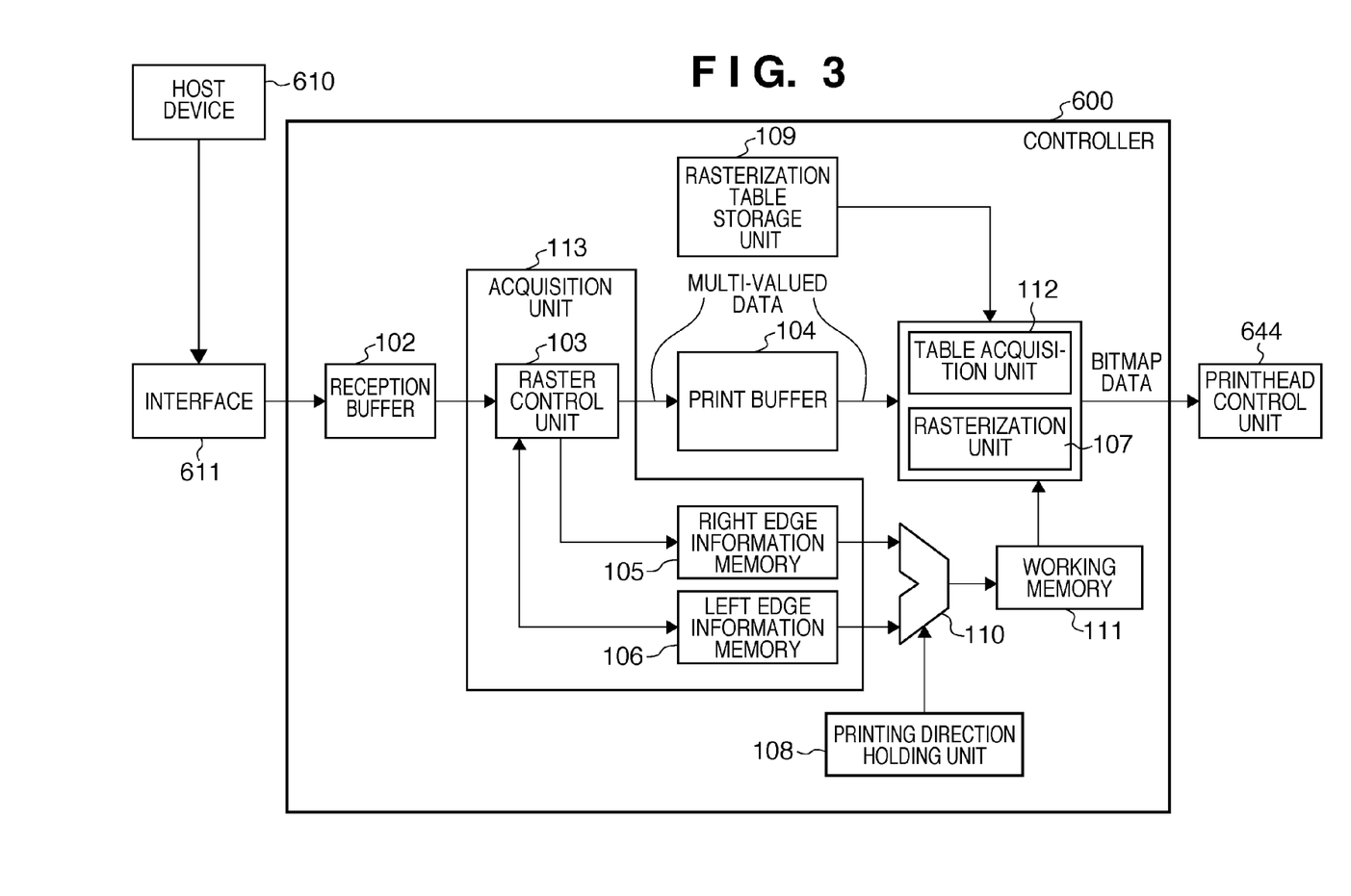
FIG. 3 is a block diagram showing an example of the functional configuration of a printing system according to one embodiment of the present invention.

FIG. 3 is a block diagram showing an example of the functional configuration of the controller 600 shown in FIG. 2.

The controller 600 includes the I/F 611, a reception buffer 102, a print buffer 104, a rasterization unit 107, and an acquisition unit 113. The controller 600 also includes a printing direction holding unit 108, rasterization table storage unit (pattern table storage unit) 109, selector 110, working memory 111, and table acquisition unit 112.

The I/F 611 receives data in the form of a raster (i.e., raster data) from the host device 610. The reception buffer 102 temporarily stores the data received from the host device 610 as reception data. The data stored in the reception buffer 102 is formed from raster data (to be also sometimes simply referred to as a raster hereinafter). The raster data stored in the reception buffer 102 is sent to a raster control unit 103 for each raster.

The acquisition unit 113 which acquires pattern numbers will be explained next. The acquisition unit 113 includes the raster control unit 103, a right edge information memory 105, and a left edge information memory 106. The left edge information memory 106 functions as a first storage unit and stores the initial value of the identification number (to be referred to as the pattern number hereinafter) of the raster leading edge (raster left edge). The acquisition unit 113 stores, in the left edge information memory 106, an initial value for, e.g., raster data received first after the printing apparatus is turned on. In another example, when the acquisition unit 113 receives a print job for printing images on a plurality of pages, it often stores, in the left edge information memory 106, an initial value for the first raster data in this job. This initial value of the pattern number is stored in correspondence with each tone. Note that the pattern number is a number set in correspondence with each rasterization table. The initial value of the raster left edge can be set arbitrarily. For example, in the left edge information memory 106, a predetermined value ("1") is set.

The right edge information memory 105 functions as a second storage unit and stores the pattern number of the raster trailing edge (raster right edge). This pattern number will be described later. The initial value of this pattern number is set in correspondence with each tone.

The raster control unit 103 acquires data from the reception buffer 102 for each raster, performs H/V (horizontal-vertical) conversion of the acquired raster, and stores the converted data in the print buffer 104. In this storage, the raster control unit 103 determines the tone of each data (multi-valued data) within the raster. The raster control unit 103 acquires the pattern numbers of rasterization tables corresponding to respective tones, stored in the left edge information memory 106, and counts up or down the acquired pattern numbers every time multi-valued data with the same tone appears. With this operation, the raster control unit 103 sets rasterization tables (pattern tables) for respective multi-valued data contained in one raster. After setting rasterization tables corresponding to one raster, the raster control unit 103 stores the counted up or down pattern numbers of rasterization tables corresponding to respective tones in the right edge information memory 105. In this manner, the pattern number stored in the right edge information memory 105 is determined based on the pattern number stored in the left edge information memory 106 and the number of multi-valued data with the same tone. To put it another way, the left edge information memory 106 stores a pattern number corresponding to multi-valued data stored first, and the right edge information memory 105 stores a pattern number corresponding to multi-valued data stored lastly. Although pattern numbers are acquired before raster data is stored in the print buffer 104 in this embodiment, they may be acquired after raster data is stored in the print buffer 104.

The printing direction holding unit 108 holds printing direction designation information indicating the scanning direction, i.e., the printing direction of the printhead 3. This printing direction designation information is held for each raster.

The rasterization table storage unit 109 functions as a matrix storage unit which stores a rasterization table (dot matrix). A plurality of rasterization tables are held for each tone. The size of a rasterization table depends on the quantization number (tone value) for quantizing multi-valued data. Note that in this embodiment, serial pattern numbers are assigned to rasterization tables for use in rasterization of multi-valued data with the same tones.

The selector 110 determines the printing direction based on the printing direction designation information, selects the data in the left edge information memory 106 in forward printing, and selects the data in the right edge information memory 105 in backward printing. With this operation, pattern numbers corresponding to the printing direction are stored in the working memory 111. Note that whether to select the left edge information memory 106 or right edge information memory 105 as a source from which pattern numbers are acquired is switched every time, for example, printing corresponding to the printing width of the printhead 3 is completed.

The table acquisition unit 112 acquires rasterization tables from the rasterization table storage unit 109 prior to rasterization of raster data. The acquisition of rasterization tables is performed for each raster. More specifically, the numbers of patterns rasterized in the working memory 111 are acquired as initial values, and then rasterization tables corresponding to the pattern numbers are sequentially acquired while counting up or down the acquired pattern numbers every time multi-valued data with the same tone appears.

The rasterization unit 107 acquires data from the print buffer 104 for each raster, and rasterizes the acquired raster into bitmap data. This rasterization is performed using the rasterization tables acquired by the table acquisition unit 112. The bitmap data rasterized by the rasterization unit 107 is sent to the printhead control unit 644. With this operation, the printhead control unit 644 prints by controlling the printhead 3 based on the sent bitmap data.

Figure 4:
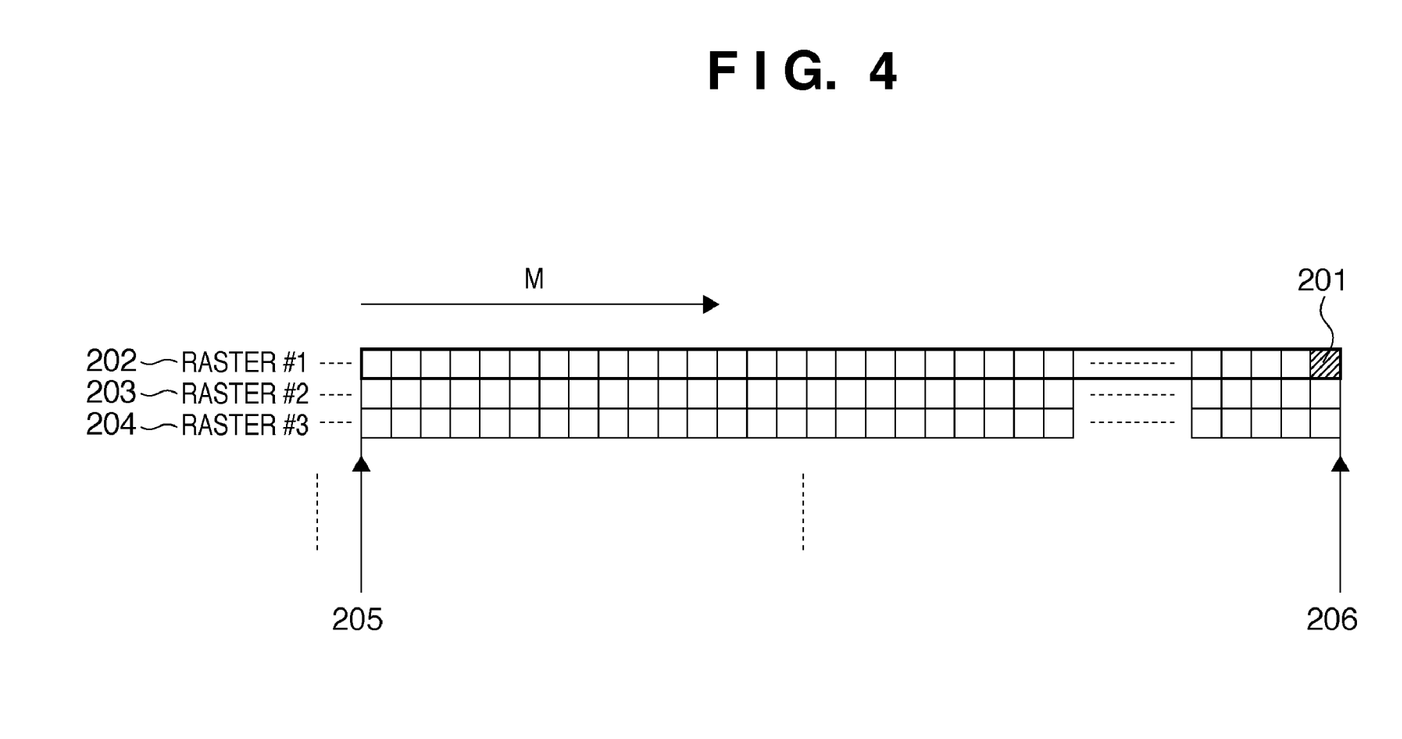
FIG. 4 is a view showing an example of the outline of reception data sent from a reception buffer 102 to a raster control unit 103.

FIG. 4 is a view showing an example of the outline of reception data sent from the reception buffer 102 to the raster control unit 103.

Rasters are sent from the reception buffer 102 to the raster control unit 103 one by one from the raster leading edge (raster left edge). The raster control unit 103 performs H/V conversion of the sent raster, stores the converted data in the print buffer 104 for each column, and updates the pattern numbers of rasterization tables based on the tone value of multi-valued data 201. Rasters are transferred from the reception buffer 102 to the raster control unit 103 in a direction M. Reference numeral 205 denotes the first pixel (a pixel transferred first); and 206, the last pixel. After the H/V conversion process, the raster control unit 103 writes the current pattern numbers in the right edge information memory 105.

Figure 5:
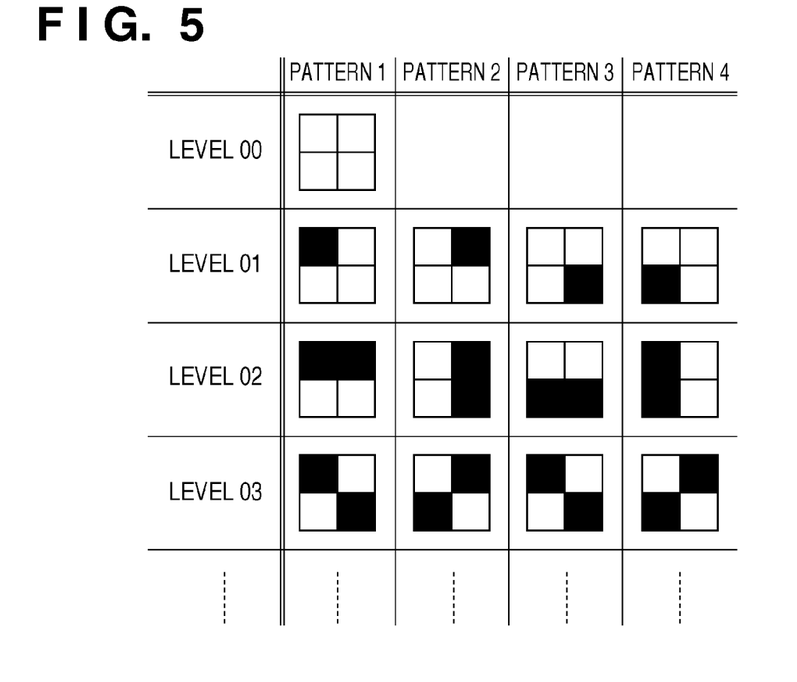
FIG. 5 is a table showing an example of rasterization patterns corresponding to respective tones.
Figure 6:
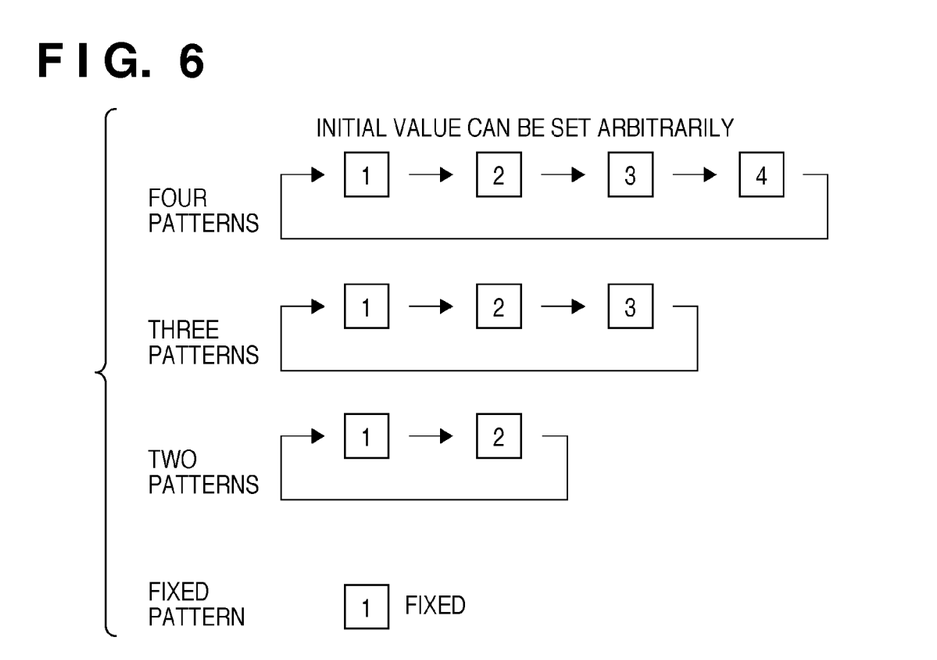
FIG. 6 is a diagram for explaining the outline of a method of selecting rasterization tables in correspondence with respective tones.

As described above, each tone has a plurality of rasterization patterns (rasterization tables). When, for example, four types of rasterization tables 1 to 4 are set in correspondence with respective tones, the rasterization results each are 4-bit (2×2) data, as shown in FIG. 5. The raster control unit 103 switches the pattern number every time, for example, data with each tone appears, and updates the pattern so that the pattern number returns to 1 (minimum value) after reaching 4 (maximum value), as shown in FIG. 6.

The outline of a raster data rasterization process will be explained herein with reference to FIGS. 9A to 9C.

Figure 9A:
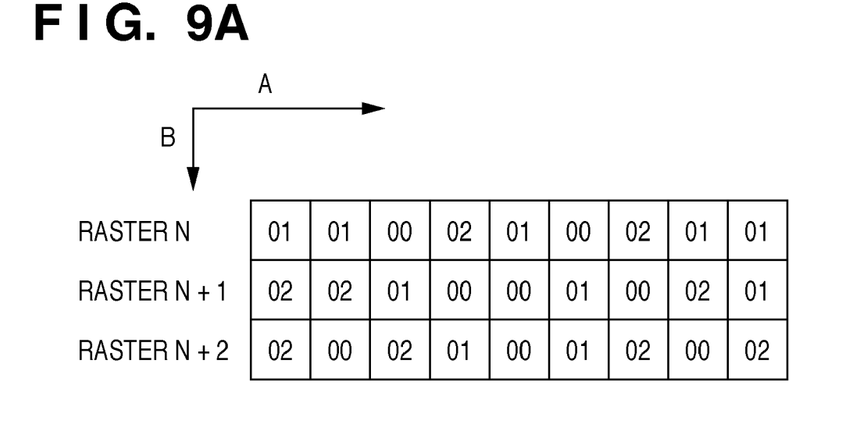
FIGS. 9A to 9C are tables showing an example of the outline of a raster data rasterization process.

FIG. 9A shows an example of multi-valued data stored in the print buffer 104 shown in FIG. 3. For the sake of easy explanation, a case in which the print buffer 104 has a size of 9 pixels in a direction A and 3 pixels in a direction B will be exemplified herein.

The print buffer 104 includes 9-pixel areas for each of three rasters (N, N+1, N+2). In this case, the print buffer 104 stores tone data of three types (00, 01, 02). The direction A is the printhead scanning direction, and the direction B is the direction in which electrothermal transducers (printing elements) are arrayed.

A concrete example of the method of assigning the pattern numbers of rasterization tables described with reference to FIG. 6 will be given next. FIG. 9B shows a case in which pattern numbers are assigned to tone data 01 shown in FIG. 9A, and FIG. 9C shows a case in which pattern numbers are assigned to tone data 02 shown in FIG. 9A.

Figure 9B:
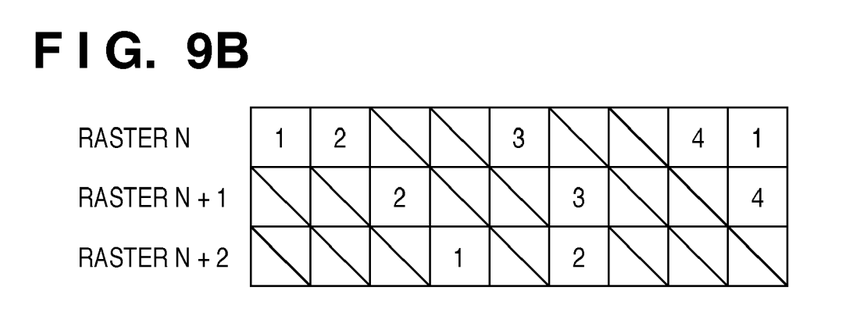

In the pattern number assignment, first, pattern numbers are assigned to tone data 01 in raster N in the direction A, as shown in FIG. 9B. Then, pattern numbers are similarly assigned to tone data 01 in rasters N+1 and N+2. Pattern numbers are also assigned to tone data 02 in the same way as in tone data 01, as shown in FIG. 9C. Note that pixels indicated by hatched portions in FIGS. 9B and 9C mean pixels for which no corresponding tone data are present.

Pattern numbers stored in the right edge information memory 105 and left edge information memory 106 shown in FIG. 3 will be explained next with reference to FIGS. 10A and 10B. For the sake of easy explanation, a case in which the right edge information memory 105 and left edge information memory 106 each hold pieces of information corresponding to three rasters in bi-directional (two-way) printing mode (bi-directional scan mode) will be exemplified herein.

Figure 10A:
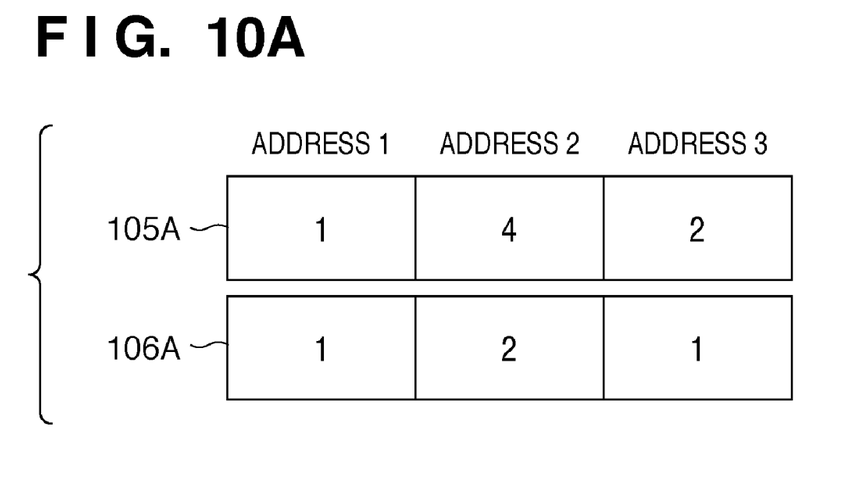
FIGS. 10A and 10B are tables showing an example of pattern numbers stored in a right edge information memory 105 and left edge information memory 106 shown in FIG. 3.

FIG. 10A shows pattern numbers stored in the right edge information memory 105 and left edge information memory 106 when the pattern numbers shown in FIG. 9B are assigned. Reference numeral 105A denotes pattern numbers stored in the right edge information memory 105 for tone data 01; and 106A, pattern numbers stored in the left edge information memory 106 for tone data 01. The right edge information memory 105 stores the pattern numbers of respective rasters at the right edges in turn from the left. For example, the pattern number of tone data 01 at the right edge in raster N is "1", as shown in FIG. 9B. Hence, "1" is stored at address 1 of the right edge information memory 105 shown in FIG. 10A. Also, the pattern number of tone data 01 at the left edge in raster N is "1", as shown in FIG. 9B. Hence, "1" is stored at address 1 of the left edge information memory 106 shown in FIG. 10A. Similarly, the pattern number of tone data 01 at the right edge in raster N+1 is "4", as shown in FIG. 9B. Hence, "4" is stored at address 2 of the right edge information memory 105 shown in FIG. 10A. Also, the pattern number of tone data 01 at the left edge in raster N+1 is "2", as shown in FIG. 9B. Hence, "2" is stored at address 2 of the left edge information memory 106 shown in FIG. 10A. Similarly, for tone data 01 in raster N+2, "2" is stored at address 3 of the right edge information memory 105, and "1" is stored at address 3 of the left edge information memory 106, as shown in FIG. 10A. It is noted that, in one-way printing (scan) mode, predetermined value ("1") is stored at all address of the left edge information memory 106.

Figure 9C:
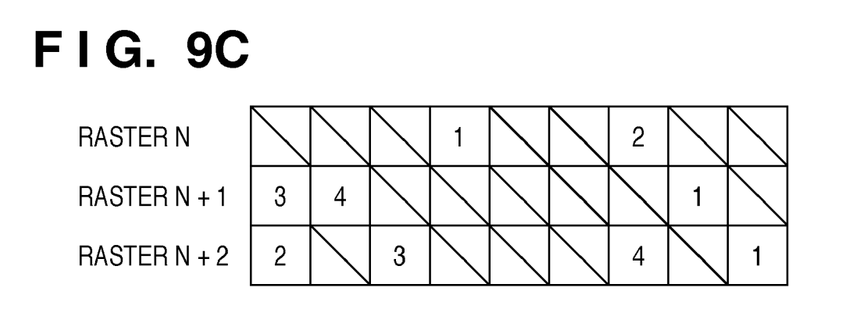
Figure 10B:
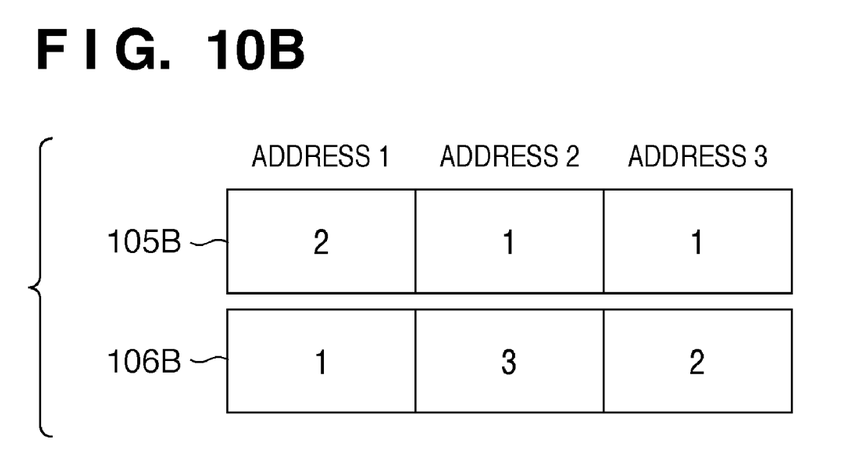

FIG. 10B shows pattern numbers stored in the right edge information memory 105 and left edge information memory 106 when the pattern numbers shown in FIG. 9C are assigned. Reference numeral 105B denotes pattern numbers stored in the right edge information memory 105 for tone data 02; and 106B, pattern numbers stored in the left edge information memory 106 for tone data 02. In this case as well, the pattern numbers of tone data 02 at both the right and left edges are stored in the respective memories, as in the case explained with reference to FIGS. 9B and 10A. It is noted that, in one-way printing (scan) mode, predetermined value ("1") is stored at all address of the left edge information memory 106.

The raster control unit 103 shown in FIG. 3 includes a register which holds pattern numbers for the above-mentioned pattern number assignment. The initial value of the pattern number is set to "1" in raster N, as shown in FIG. 9B. Subsequent pattern numbers are set based on the update rule (assignment rule) described with reference to FIG. 6.

An example of the process sequence in the printing apparatus 1 shown in FIG. 3 will be explained herein with reference to FIG. 7. Note that a process after the printing apparatus 1 receives data from the host device 610 will be explained.

When the printing apparatus 1 receives data from the host device 610, it stores the received data in the reception buffer 102 as reception data (S101). The raster control unit 103 acquires data from the reception buffer 102 for each raster, performs H/V conversion of the acquired raster, and determines the tone of each data within the raster (S102). The pattern numbers of rasterization tables are updated in correspondence with the tones of respective data (S103). In this pattern number updating, the initial values of pattern numbers corresponding to respective tones are acquired from the left edge information memory 106, and the pattern numbers are set for respective data based on the acquired initial values. For example, the pattern number is counted up every time data with the same tone appears, and the corresponding pattern number is set for each data.

When the pattern number updating is ended, the raster control unit 103 stores rasters of multi-valued data in the print buffer 104 (S104). At this time, the raster control unit 103 stores, in the right edge information memory 105, the pattern number (last value) at the time point when processing of one raster is completed. The raster control unit 103 further stores, in the left edge information memory 106 (106A and 106B), the pattern number (initial value) in bi-directional printing mode (bi-directional (two-way) scan mode) as shown in FIG. 10A and FIG. 10B (S105). The processes from step S102 to step S105 are repeated until all rasters have been processed (NO in step S106).

After the processes up to step S105, the printing apparatus 1 starts a rasterization process. At the start of this process, first, the printing apparatus 1 determines, by the selector 110, the rasterization direction (printing direction) of a target raster. This determination is done based on the printing direction designation information held in the printing direction holding unit 108. If the raster is to be printed in the forward direction (YES in step S107), the selector 110 selects the data in the left edge information memory 106. With this operation, the pattern number stored in the left edge information memory 106 is stored in the working memory 111 (S108). If the raster is to be printed in the backward direction (NO in step S107), the selector 110 selects the data in the right edge information memory 105. With this operation, the pattern number stored in the right edge information memory 105 is stored in the working memory 111 (S109).

When the initial value of the pattern number is read out to the working memory 111, the printing apparatus 1 confirms, by the rasterization unit 107, the data rasterization direction based on the printing direction designation information held in the printing direction holding unit 108. After confirming the rasterization direction, the printing apparatus 1 reads out, by the rasterization unit 107, multi-valued data from the print buffer 104, and acquires, by the table acquisition unit 112, a rasterization table based on the initial value of the pattern number stored in the working memory 111. The printing apparatus 1 then rasterizes, by the rasterization unit 107, the multi-valued data into bitmap data based on the acquired rasterization table and the rasterization direction (S110). For example, in rasterization in the forward raster direction (forward direction), the initial value of the pattern number is read out from the left edge information memory 106, and the pattern number is counted up every time data with the same tone appears. In rasterization in the backward raster direction (backward direction), the initial value of the pattern number is read out from the right edge information memory 105, and the pattern number is counted down every time data with the same tone appears. The updated pattern number is stored in the working memory 111 for each updating. The data rasterized into bitmap data by the rasterization unit 107 is sent from the rasterization unit 107 to the printhead control unit 644 (S111). With this operation, the printhead control unit 644 prints by controlling the printhead 3 based on the sent bitmap data. The processes from step S107 to step S112 are repeated until all rasters have been processed (NO in step S112).

Figure 7:
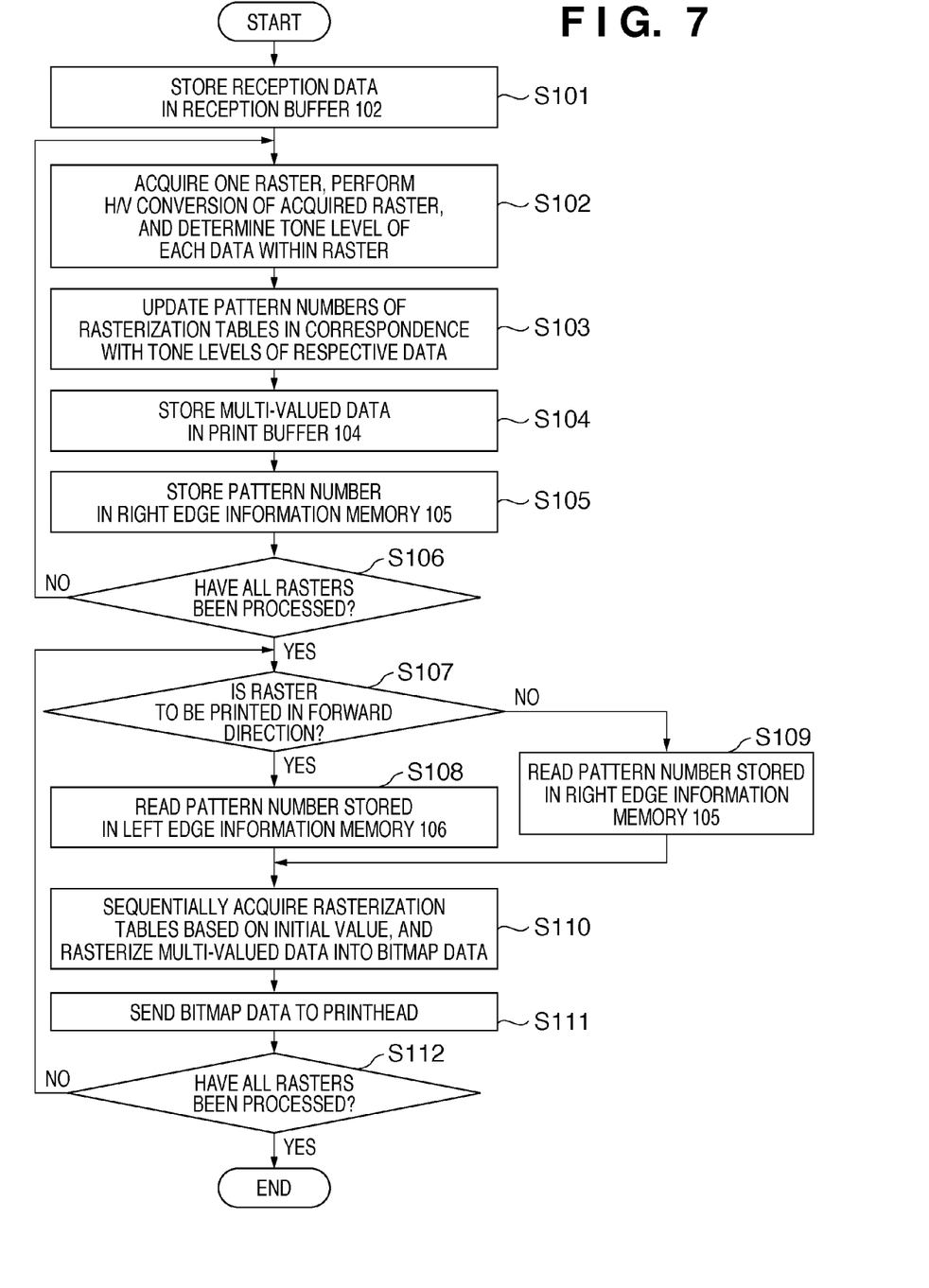
FIG. 7 is a flowchart illustrating an example of the process sequence in the printing apparatus 1 shown in FIG. 3.

Note that the process sequence explained with reference to FIG. 7 is merely an example, so the process sequence in the printing apparatus 1 is not limited to this, and can be changed as needed. For example, bitmap data may be sent to the printhead control unit 644 after rasterization of bitmap data in all rasters is completed. Also, some of the above-mentioned processes may be done in parallel.

As has been described above, according to this embodiment, it is possible to make the results of one-way printing and two-way printing consistent with each other in an arrangement which changes the rasterization table for use in rasterization of a given tone every time data with the given tone appears. Also, because the above-mentioned arrangement stores input data in the print buffer 104 intact as multi-valued data, it can suppress the memory capacity. Moreover, because the above-mentioned arrangement holds a plurality of rasterization tables in correspondence with respective tones and performs rasterization using one of these rasterization tables, it can reduce stripes and nonuniformity.

As described above, the initial value of the raster leading edge (raster left edge) can be set arbitrarily. When the initial value is set arbitrarily, it is possible to prevent pattern fixing even if identical data continue in a plurality of rasters in the vertical direction.

Although the foregoing is one exemplary embodiment of the present invention, the present invention is not limited to the embodiment which has been described above and shown in the drawings, and can be appropriately modified and practiced without changing the gist thereof.

For example, although a case in which multi-valued data is rasterized into bitmap data based on one of four 4-bit rasterization patterns of each tone has been exemplified in the above-described embodiment, the present invention is not limited to this. For example, the rasterization pattern may be fixed. Also, rasterization may be performed using a rasterization table for rasterizing multi-valued data into 2- or 8-bit data as the rasterization pattern.

Figure 8:
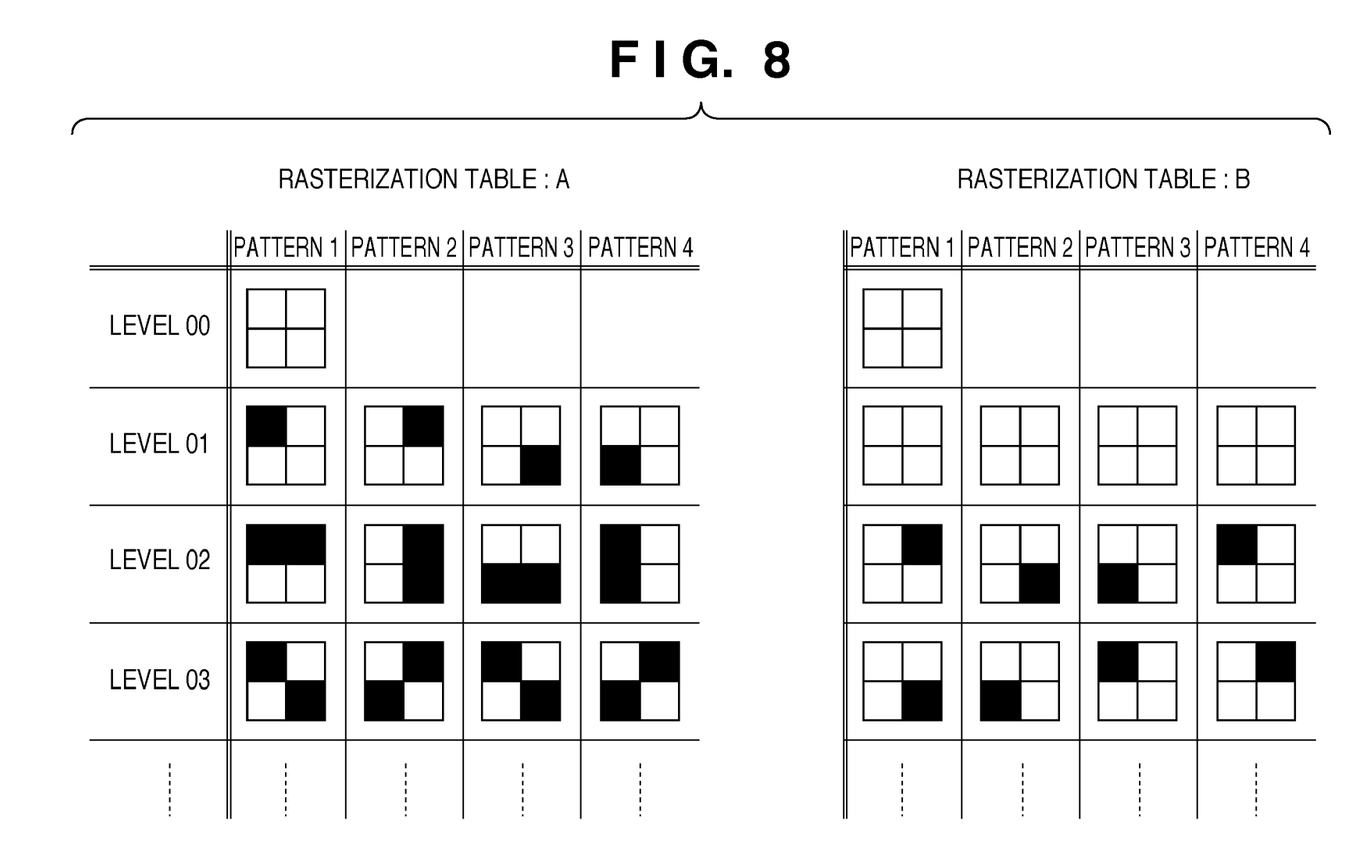
FIG. 8 is a table showing a modification.

Also, although a case in which one multi-valued data is rasterized in one plane has been exemplified in the above-described embodiment, one multi-valued data may be rasterized in a plurality of planes. In this case, the initial values and last values of the pattern numbers and rasterization tables are used in number equal to planes. FIG. 8 shows an example of rasterization tables for rasterizing one multi-valued data in two planes. The rasterization tables shown in FIG. 8 are effective in rasterizing a large nozzle and a small nozzle at once. In this case, rasterization is performed using a rasterization table A as a plane for the small nozzle, and a rasterization table B as a plane for the large nozzle.

Further, although whether to update the pattern numbers for all tone data or for one or a plurality of arbitrary tone data, for example, is not mentioned in the above-described embodiment, either choice is acceptable. In the latter case, it is possible to, for example, suppress the memory capacity.

As has been described above, according to the present invention, it is possible to make the results of one-way printing and two-way printing consistent with each other in an arrangement which changes the dot matrix for use in rasterization of a given tone every time data with the given tone appears.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-043147 filed on Feb. 25, 2009, which is hereby incorporated by reference herein in its entirety.

What is claimed is:

1. A printing apparatus which prints by scanning a printhead in two directions based on raster data containing multi-valued data, the apparatus comprising:
   a print buffer configured to store a plurality of raster data;
   a buffer control unit configured to sequentially store multi-valued data contained in each raster data in said print buffer in correspondence with a predetermined direction of the two directions;
   a pattern buffer configured to store pattern data corresponding to a tone value of the multi-valued data;
   an acquisition unit configured to acquire, for each raster data, identification information corresponding to the multi-valued data stored in said print buffer first and identification information corresponding to the multi-valued data stored in said print buffer lastly for each tone value based on initial values of identification information and the number of multi-valued data contained in each raster data;

a generation unit configured to generate bitmap data from the multi-valued data using pattern data read out from said pattern buffer based on one identification information selected from the two pieces of identification information based on a scanning direction of the printhead for each scanning of the printhead; and a print control unit configured to control printing of the printhead based on the bitmap data generated by said generation unit.

2. The apparatus according to claim 1, wherein said generation unit comprises an update unit configured to update the selected identification information for each tone value.

3. The apparatus according to claim 1, wherein said acquisition unit comprises an identification information buffer configured to sequentially receive raster data and store identification information corresponding to the multi-valued data stored in said print buffer first and identification information corresponding to the multi-valued data stored in said print buffer lastly.

4. The apparatus according to claim 1, wherein said acquisition unit comprises a counting unit configured to count the number of multi-valued data contained in the same raster data for each tone value.

5. The apparatus according to claim 1, wherein, based on the identification information corresponding to the multi-valued data stored in said print buffer lastly, said acquisition unit decides identification information corresponding to the multi-valued data stored in said print buffer first in subsequent raster data.

6. A processing method for a printing apparatus which includes a pattern buffer configured to store pattern data corresponding to a tone value of multi-valued data, and prints by scanning a printhead in two directions based on raster data containing the multi-valued data, the method comprising:

sequentially storing multi-valued data contained in each raster data in a print buffer in correspondence with a predetermined direction of the two directions;

acquiring, for each raster data, identification information corresponding to the multi-valued data stored in the print buffer first and identification information corresponding to the multi-valued data stored in the print buffer lastly for each tone value based on initial values of identification information and the number of multi-valued data contained in each raster data;

generating bitmap data from the multi-valued data using pattern data read out from the pattern buffer based on one identification information selected from the two pieces of identification information based on a scanning direction of the printhead for each scanning of the printhead; and controlling printing of the printhead based on the bitmap data generated in the generating the bitmap data.

* * * * *